Patented Aug. 22, 1933

1,923,111

UNITED STATES PATENT OFFICE 1,923,111

LAMINATED GLASS AND METHOD OF MAKING THE SAME

William Henry Moss, Cumberland, Md., assignor to Celanese Corporation of America, a Corporation of Delaware No Drawing. Application February 12, 1929
Serial No. 339,400

4 Claims. (Cl. 49—81)

This invention relates to the preparation of laminated glass, and relates more particularly to a method of forming sheets of plastic material containing derivatives of cellulose directly on the surface of adhesive coated sheets of glass to be laminated and then applying an adhesive to the sheets of plastic material thus formed prior to lamination.

This application is in part a continuation of my copending application No. 313,967 filed October 20, 1928.

An object of my invention is to prepare laminated glass that is shatterless and whose component parts are well stuck.

A further object of my invention is to prepare laminated glass by forming sheets or heavy films of a plastic material containing a derivative of cellulose directly upon the adhesive coated glass to be laminated and then applying an adhesive coat to the sheets or heavy films of plastic material thus formed prior to lamination. Other objects of my invention will appear from the following detailed description.

In the preparation of laminated glass having a layer of plastic material containing derivatives of cellulose, the prior practice has been to form a cellulose derivative sheet by an operation completely separate from the preparation of the laminated glass. The sheet that has been used in prior practice has been usually formed by kneading the derivatives of cellulose together with volatile solvents and plasticizers, working the doughy mass thus formed into blocks and planing the blocks into sheets by means of knives. I have found that if instead of forming such plastic sheets as a separate process, the sheets are directly formed on adhesive coated glass by coating the same with a solution of a derivative of cellulose, many useful results are obtained. The sheets so formed on the glass are free of the knife lines ordinarily found in sheets made by the old process, and better adhesion is obtained between the cellulose derivative sheets and the glass. In order to obtain further and higher degree of adhesion, I coat the sheets of derivatives of cellulose formed on the glass with an adhesive prior to laminating the same with the other sheet of glass.

In accordance with my invention, I form laminated glass by applying one or more coats of a heavy but freely flowing solution of a derivative of cellulose in a volatile solvent onto a sheet of glass that has been coated with a suitable adhesive. After a sufficiently thick layer or sheet of the derivative of cellulose is built on the glass, and after the same has dried sufficiently, a coating of adhesive is applied to the layer or sheet of derivative of cellulose thus formed, and then another sheet of adhesive coated glass is placed thereon, and the assembly is pressed at elevated temperatures.

The cellulose derivatives employed in my process may be an inorganic derivative of cellulose such as cellulose nitrate, but more particularly organic derivatives of cellulose such as organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Any suitable volatile solvent may be employed in making the solution. Examples of some of the solvents are acetone, benzone, ethyl acetate, methylene chloride, ethylene dichloride, methyl alcohol, or any suitable mixtures of two or more of these liquids. In the selection of the liquid or mixtures of liquids to be employed as a solvent, due consideration should be given to the solubility characteristic of the specific derivative of cellulose employed.

The glass employed in making the laminated glass may be a blown, plate, drawn or any other glass that is suitable for use in automobile windshields and windows, windows in railroad cars or in any other places where laminated glass is desired.

The glass to be laminated is first coated with a layer of a suitable adhesive material. This adhesive may contain gelatin when cellulose nitrate is employed, or polymerized vinyl acetate, but preferably contains a synthetic resin that is compatible with the derivative of cellulose employed in making the plastic sheets. Examples of such synthetic resins are the fusible and soluble phenol-aldehyde resins prepared in the presence of an acid catalyst, diphenylol propane-formaldehyde resins, toluene sulfonamide-formaldehyde resins, the resins prepared by heating lactic acid, etc. Preferably these synthetic resins are dissolved together with an amount of a derivative of cellulose which is preferably the same as that employed in making the plastic sheets. The formation and applications of such adhesive coating compositions are more fully described in applications Nos. 313,961, 313,962, 313,963, 313,964, 313,965 filed October 20, 1928.

While ordinary solutions of derivatives of cellulose may be used for making the plastic sheets on glass, I have found that much better results from the point of view of light-fastness may be obtained by employing specially purified derivatives of cellulose. The derivative of cellulose, such as cellulose acetate, may be purified by careful and thorough filtration of solutions of the same as described in application No. 313,966 filed October 20, 1928, or by treating the same in solid form or in solution with oxidizing agents such as nitric acid, hydrogen peroxide, a hypochlorite, a permanganate or a dichromate in aqueous solution, as described in my copending applications No. 313,968 filed October 20, 1928, or 334,353 filed January 22, 1929.

If desired the solutions of derivatives of cellulose to be employed in making the sheets on the glass may also contain plastifiers such as triacetin, diethyl tartrate, dibutyl tartrate, diethyl phthalate, diphenylol propane, etc. Medium boiling solvents such as ethyl lactate and high boiling solvents such as diacetone alcohol may also be added to the solution. If desired, various resins, and particularly the synthetic resins compatible with derivatives of cellulose described above, may also be added to the solution. Stabilizers such as urea, and dyes and/or pigments, especially those of violet or blue tint opposed to yellowness, may also be added.

The solution of a derivative of cellulose may be applied to the glass to be laminated in any suitable manner such as by brushing, spraying or flowing the same onto the surfaces of the adhesive coated glass. If a continuous method of coating is desired, the glass may be placed on a conveyor and passed under the brushing, spraying or flowing device. The coat of adhesive on the glass is first permitted to dry to any desired extent before application of the cellulosic solution. In many cases it is possible to apply the coats of the cellulose derivative solution before the adhesive layer is completely dry, if desired, the adhesive also may be first dried to such an extent that it is dry to the touch, or it may even be dried by baking at any suitable temperature.

The coating composition containing the derivative of cellulose may be applied to the adhesive coated glass in sufficient thickness in one application to form a sheet suitable for the lamination process. On the other hand, the sheet of adhesive film may be built up to the desired thickness by applying two or more coats of the solution until a film of the desired thickness is obtained on the surface of the glass. The various coats may be dried before the application of subsequent ones to any desired extent. In general, it is not absolutely necessary to dry out the whole of the solvent from one coat before applying the second coat. When a sufficient thickness of the cellulose derivative material has been built up on the glass, the whole may be treated at any suitable temperature until substantially all of the volatile solvent is evaporated.

In accordance with the invention to which this application is specifically directed, after the layer of derivative of cellulose material is formed on the glass, any suitable adhesive, such as those described above, is applied to the exposed surface thereof, so that when the same is laminated, it adheres with greater ease to the adhesive coated glass or to another layer of derivative of cellulose on the other adhesive coated glass. When the laminated glass is prepared from two sheets of glass each of which is coated with a layer of the cellulose derivative material, either one or both layers of the derivative of cellulose material may be coated on the surfaces which come in contact with each other with adhesive solution. The adhesive coatings are allowed to dry at 50° C. for 15 minutes or at any suitable temperature for from a few minutes to 24 hours or more, as desired. If desired, a substantial proportion of a softener or plasticizer may be added to the adhesive solution for use in this manner, so that the lamination may take place at a lower temperature, and with more ease than when an adhesive solution containing little or no softener is used.

In the preparation of a laminated glass consisting of two sheets of glass with one interposed layer of plastic material containing derivatives of cellulose, a glass sheet that has been coated with the adhesive and the layer of derivative of cellulose, which in turn has been coated with an adhesive, is assembled with another sheet of glass that is coated with the adhesive. Obviously the surface of the second sheet of glass that has been coated with the adhesive is placed against the adhesive coat on the layer of the derivative of cellulose. The assembled sheets are then pressed at elevated temperature to form a well stuck and shatterless laminated glass. As a variation, two sheets of glass each coated with an adhesive and a layer of a derivative of cellulose, one or both layers of the derivatives of cellulose having an adhesive coat thereon, may be placed together so that the layers of cellulose derivatives are in juxtaposition, and the sheets then pressed to form laminated glass.

In order further to illustrate my invention but without being limited, thereto, the following specific examples are given.

*Example I*

The following is an example of a coating composition containing the derivative of cellulose dissolved in a volatile solvent that may be used for making the layer on the adhesive coated glass.

| | Parts by weight |
|---|---|
| Cellulose acetate | 20 |
| Acetone | 100 |

If desired, the cellulose acetate may be replaced in whole or in part by cellulose propionate or cellulose butyrate.

*Example II*

The following is another example of a suitable coating composition that may be used in my invention.

| | Parts by weight |
|---|---|
| Cellulose acetate | 20 |
| Triacetin | 10 |
| Acetone | 100 |

The cellulose acetate may be replaced by cellulose nitrate.

*Example III*

This is still another example of a suitable coating composition.

| | Parts by weight |
|---|---|
| Cellulose acetate | 25 |
| Triacetin | 5 |
| Diethyl phthalate | 5 |
| Acetone | 80 |
| Benzene | 10 |
| Ethyl acetate | 10 |
| Diacetone alcohol | 5 |

*Example IV*

The following is an example of an adhesive solution that is suitable for application by spraying, dipping or flowing, to cause sheets made of a plastic material containing cellulose acetate to adhere to glass in lamination.

| | Parts by weight |
|---|---|
| Cellulose acetate | 2 |
| Compatible synthetic resin | 3 |
| Triacetin | 2 |
| Acetone | 50 |
| Alcohol | 25 |
| Benzene | 25 |
| Ethyl lactate | 5 |

The compatible synthetic resin may be the fusible and soluble toluene sulfonamide formaldehyde resin or the fusible and soluble diphenylol propane-formaldehyde resin.

It is to be understood that the foregoing detailed description is given merely by way of illustration and that many variations may be made therein without departing from the spirit of my invention.

Having described my invention what I claim and desire to secure by Letters Patent is:

1. The method of preparing laminated glass comprising coating a sheet of glass with a suitable adhesive, applying to said adhesive coated glass a solution in a volatile solvent of a derivative of cellulose in sufficient amounts to form a sheet, permitting the volatile solvent to evaporate, applying an adhesive in the form of a solution to the sheets thus formed, placing another sheet of glass over the sheet of the derivative of cellulose and pressing at elevated temperature.

2. The method of preparing laminated glass comprising coating a sheet of glass with a suitable adhesive, applying to said adhesive coated glass a solution in a volatile solvent of cellulose acetate in sufficient amounts to form a sheet, permitting the volatile solvent to evaporate, applying an adhesive in the form of a solution to the sheets thus formed, placing another sheet of glass over the sheet of the cellulose acetate and pressing at elevated temperature.

3. The method of preparing laminated glass comprising coating a sheet of glass with a suitable adhesive, applying to said adhesive coated glass a solution in a volatile solvent of a derivative of cellulose in sufficient amounts to form a sheet, permitting the volatile solvent to evaporate, applying an adhesive in the form of a solution to the sheet thus formed, placing thereon another sheet of glass similarly coated with adhesive-cellulose derivative sheet-adhesive, and pressing at elevated temperature.

4. The method of preparing laminated glass comprising coating a sheet of glass with a suitable adhesive, applying to said adhesive coated glass a solution in a volatile solvent of cellulose acetate in sufficient amounts to form a sheet, permitting the volatile solvent to evaporate, applying an adhesive in the form of a solution to the sheet thus formed, placing thereon another sheet of glass similarly coated with adhesive-cellulose derivative sheet-adhesive, and pressing at elevated temperature.

WILLIAM HENRY MOSS.